United States Patent [19]
Potter

[11] Patent Number: 5,049,801
[45] Date of Patent: Sep. 17, 1991

[54] DUAL SPEED CONTROLLER FOR ATTIC VENTILATOR

[75] Inventor: Paul S. Potter, Dallas, Tex.

[73] Assignee: Clark United Corporation, Dallas, Tex.

[21] Appl. No.: 491,168

[22] Filed: Mar. 9, 1990

[51] Int. Cl.$^5$ .......................... H02P 1/44; F24F 7/00
[52] U.S. Cl. ..................... 318/785; 318/782; 318/793; 318/772; 236/DIG. 9; 236/49.3
[58] Field of Search ................ 318/726–832; 236/47, 49.3, 67, 78 B, 78 C, 79, 80 C, 91 F, 101 B, DIG. 9; 126/419, 422, 436; 98/42.04, 42.07, 116

[56] References Cited

U.S. PATENT DOCUMENTS

| | | | |
|---|---|---|---|
| 1,941,546 | 1/1934 | Fillo | 236/DIG. 9 X |
| 2,560,829 | 7/1951 | Stewart | 236/78 B X |
| 2,753,119 | 7/1956 | Stunkard | 236/49.3 |
| 3,389,316 | 6/1968 | Roby | 318/772 |
| 3,934,797 | 1/1976 | Perlmutter | 236/49.3 X |
| 4,030,009 | 6/1977 | Halsted | 318/772 |
| 4,041,360 | 8/1977 | Morris | 318/782 |
| 4,078,393 | 3/1978 | Wills | 318/806 X |
| 4,085,594 | 4/1978 | Mayer | 388/833 X |
| 4,167,966 | 9/1979 | Freeman | 236/DIG. 9 X |
| 4,186,875 | 2/1980 | Lewis | 236/47 |
| 4,251,026 | 2/1981 | Siegel et al. | 236/49.3 |
| 4,262,225 | 4/1981 | Hildebrandt et al. | 318/793 X |
| 4,271,898 | 6/1981 | Freeman | 236/DIG. 9 X |
| 4,673,029 | 6/1987 | Beachboard | 236/49.3 X |
| 4,724,680 | 2/1988 | Kawai | 318/779 X |
| 4,773,587 | 9/1988 | Lipman | 236/DIG. 9 X |
| 4,817,865 | 4/1989 | Wray | 236/49.3 |
| 4,877,183 | 10/1989 | Matsuda et al. | 236/49.3 |

Primary Examiner—Paul Ip
Attorney, Agent, or Firm—Dennis T. Griggs

[57] ABSTRACT

A controller for a dual speed induction motor selectively applies operating power to the low speed motor terminal or the high speed motor terminal according to the open circuit/closed circuit condition of a low temperature thermostat and a high temperature thermostat. For low speed operation, operating power is conditionally applied to the low speed motor terminal through the low temperature thermostat and through the normally closed circuit of a single pole, double throw switch. For high speed operation, operating power is conditionally applied to the high speed motor terminal through the high temperature thermostat and the normally open circuit of the single pole, double throw switch. The operating position of the single pole, double throw switch is determined by a solenoid which is connected in series circuit relation with the high temperature thermostat.

5 Claims, 1 Drawing Sheet

DUAL SPEED CONTROLLER FOR ATTIC VENTILATOR

FIELD OF THE INVENTION

This invention relates generally to speed control circuits for induction motors, and in particular to a circuit for controlling the speed of an induction motor which drives an attic ventilator fan.

BACKGROUND OF THE INVENTION

Because of the rapidly rising costs of energy, the incentives to conserve energy are increasing, both for domestic users as well as industrial users. For most domestic users in the southern regions of the United States, home air conditioning accounts for a substantial portion of the annual energy expense. Although most dwellings are insulated, a substantial amount of energy is expended by the air conditioning compressor to pump the radiant heat absorbed by the dwelling structure out of the air conditioned living space into the outside ambient air.

The air conditioning load is intensified by the thermal storage effect associated with the attic air space found in most dwellings. Air circulates very slowly in the attic air space so that its temperature rises rapidly as solar radiation is absorbed. As a result, a large amount of heat is transferred from the exposed roof structure to the air trapped within the attic air space. The body of air trapped in the attic space acts as a thermal reservoir which transfers heat through the ceiling and into the conditioned living space. Because of the large thermal mass associated with the attic air space and the roof structure, heat transfer through the ceiling and into the living space may continue long after sundown.

DESCRIPTION OF THE PRIOR ART

The thermal oven effect of the trapped attic air may be reduced by the action of vents, roof turbines and attic ventilator fans which circulate the trapped air out of the attic space. It is known to utilize a thermostat to sense the temperature of the attic air space for controlling the application of power to an attic ventilator fan when the temperature of the air space rises above a predetermined level. Other control systems include a resetting timer which automatically applies power to an attic ventilator according to a predetermined time schedule without regard to the temperature of the attic air space.

It will be appreciated that the heat load imposed by the air trapped in the attic air space will drop substantially during late night and early morning. The heat load imposed by the trapped attic air will also be reduced by rainfall or cold fronts which may occur at any time of night or day. Those control systems which operate automatically according to a programmed time schedule will cause the attic fan ventilator to operate needlessly when the attic air space temperature has been reduced by changing weather conditions, a rainstorm and the like.

Those control systems which utilize a thermostat to sense attic air temperature will cause the attic ventilator fan to operate continuously at a fixed speed as long as the attic temperature remains above the threshold temperature level, and will interrupt power to the attic ventilator as soon as the attic air temperature drops below the threshold value. Because of the the large thermal mass associated with the trapped attic air, it is desirable to circulate the trapped air out of the attic at a relatively high circulation rate during peak daytime solar loading, and thereafter to circulate the air out of the attic at a reduced flow rate during late evening/early morning or during cloudy weather conditions. It will be appreciated that single speed/single threshold temperature systems cannot provide multiple speed operation to accommodate day/night temperature fluctuations or weather induced fluctuations.

Most attic ventilators presently in use are driven by fractional horsepower electrical motors. Two commonly used electrical motors are the single phase, shaded pole induction motor, and the single phase, capacitor start/run induction motor. These induction motors include one or more armature winding taps which can be connected through switch assemblies for causing the induction motor to run at multiple speeds. Manual switch circuits have been connected to the winding taps of such induction motors for selecting a desired operating speed. Such manual control switch arrangements require operator attention to switch from one speed to another.

To reduce the cost of operating an electrically powered induction motor in an attic ventilator installation, it is desirable to drive the ventilator fan at a low speed during low thermal loading conditions, for example, during late night and early morning, and then drive the ventilator fan at a high operating speed during high thermal loading, for example, during mid-morning through late afternoon and early evening. For maximum operating efficiency, the attic ventilator fan should be turned on automatically and operated at a low fan speed when the rising attic air temperature exceeds a first threshold temperature level, for example 80 degrees F., and then be switched to a high operating fan speed when the attic air temperature exceeds a second temperature threshold level, for example 90 degrees F. As the attic air temperature declines, the ventilator fan should automatically switch to the low operating speed when the attic air temperature falls into the temperature range between the upper temperature threshold level and the lower temperature threshold level, and then automatically switch off as the attic air temperature falls below the low temperature threshold level.

OBJECTS OF THE INVENTION

It is, therefore, the principal object of the present invention to provide an improved controller for providing automatic operation of an attic fan ventilator at multiple speeds in response to varying thermal load conditions.

Another object of the invention is to provide a control circuit for use in combination with a multiple speed induction motor in an attic ventilator fan for automatically switching from one speed to another in response to changes in attic air temperature, without requiring operator attention or intervention.

A general object of this invention is to provide a control circuit for use in combination with a multiple speed induction motor which is capable of automatically changing the operating speed of the induction motor in response to the magnitude of a sensed condition such as temperature, humidity, pressure, fluid flow rate and the like.

SUMMARY OF THE INVENTION

The foregoing objects are achieved according to the present invention by a control circuit which selectively applies operating power to the low speed terminal or the high speed terminal of an induction drive motor according to the open circuit/closed circuit condition of a low temperature thermostat and a high temperature thermostat. The low temperature thermostat is a normally open thermostat which is adapted to close in response to a sensed low temperature condition, for example attic air at 80 degrees F. The high temperature thermostat is adapted to close in response to a sensed high temperature condition, for example the temperature of attic air at 90 degrees F. Operating power is conditionally applied to the low speed motor terminal through the low temperature thermostat and through the normally closed circuit of a single pole, double throw switch. Operating power is conditionally applied to the high speed motor terminal through the high temperature thermostat and the normally open circuit of the single pole, double throw switch. The operating position of the single pole, double throw switch is changed from the normally closed position to the normally open position by a solenoid which is connected in series electrical circuit relation with the high temperature thermostat.

According to the foregoing arrangement, the attic ventilator induction motor is turned on automatically and is operated at a low fan speed when the rising attic air temperature exceeds a low threshold temperature level, for example 80 degrees F., and is switched automatically to a high operating fan speed when the attic air temperature exceeds a high temperature threshold level, for example 90 degrees F. When the attic air temperature declines, as a result of a change from day to night or as a result of changing weather conditions, the ventilator fan motor is automatically switched from the high operating speed to the low operating speed when the attic air temperature falls into the temperature range between the high temperature threshold level and the low temperature threshold level. Electrical power to the induction motor is automatically interrupted when the attic air temperature falls below the low temperature threshold level.

Other features and advantages of the present invention will be appreciated by those skilled in the art upon reading the detailed description which follows with reference to the attached drawings.

DETAILED DESCRIPTION OF THE PREFERRED EMBODIMENT

In the description which follows, a preferred embodiment of the present invention is described in combination with a split phase, capacitor run induction motor in a louvered gable attic installation. It will be understood that the motor speed controller circuit of the present invention can be used to good advantage with other types of motors having a low speed power input terminal, a high speed power input terminal and a common power return terminal. For example, the dual speed controller of the present invention can be used equally well in combination with a fractional horsepower, shaded pole induction motor having an armature winding tapped for high and low speed operation. The louvered gable installation described herein is a typical attic fan application, and the controller of the present invention may be used to good advantage in combination with other attic fan installations, for example roof mounted ventilators.

Figure 1:
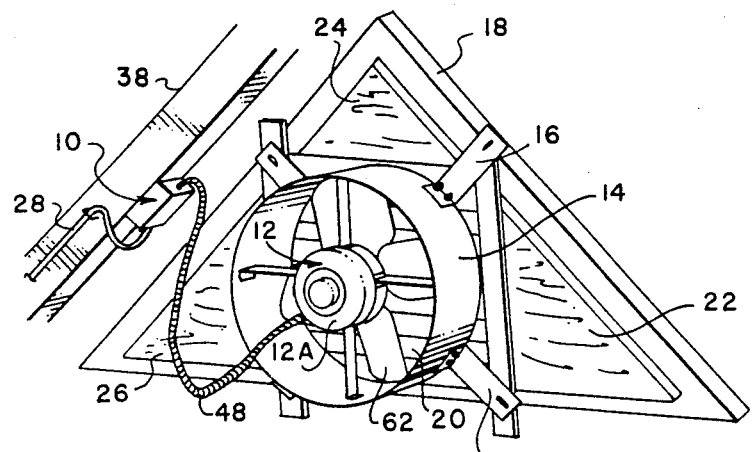
FIG. 1 is a perspective view of an attic fan ventilator installation having an induction motor connected to the dual speed controller of the present invention; and, FIG. 2 is a circuit diagram which illustrates the interconnection of an electrical power distribution circuit, an induction motor, and the dual speed controller shown in FIG. 1.

Referring now to FIG. 1, a dual speed controller 10 is connected to a power distribution circuit for applying operating power to an induction motor 12. The induction motor 12 is preferably a split phase, capacitor run induction motor rated at ⅛ horsepower, 6.5 amps, 115 volts AC, 60 Hz. Alternatively, the induction motor 12 may be a shaded pole induction motor having the same or comparable specifications. The induction motor 12 is mounted within a cylindrical fan housing 14 which is secured by brackets 16 to a gable frame 18. The gable frame 18 also supports louver panels 20 which are in airflow registration with the cylindrical fan housing 14. Airflow through the louvered area external to the cylindrical fan housing 14 is blocked by triangular panel sections 22, 24, 26.

Operating power is supplied by a domestic power distribution system through a power cable 28, which includes a common return conductor 28A, a hot power conductor 28B and a ground conductor 28C. The application of power is manually controllable by a remote override power switch 30 which is connected in electrical series relation with the hot power conductor 28B. AC power is applied automatically to the dual speed controller 10 through a common return input power terminal 32 and a hot power input terminal 34. The ground conductor 28C is electrically connected to the controller housing 10A at the input terminal 36.

The dual speed controller 10 is mounted onto a nearby rafter 38. The dual speed controller 10 includes three control power output terminals as follows: a low speed power output terminal 40, a high speed output terminal 42, a common return output terminal 44 and a ground terminal 46. The dual speed controller output terminals are electrically connected to the induction motor 12 by an armored cable 48. The armored cable 48 includes a common return power conductor 48A, a low speed power conductor 48B, a high speed power conductor 48C and a ground conductor 48D.

The split phase induction motor 12 has a low speed power input terminal 50, a high speed power input terminal 52 and a common return power input terminal 54. The motor power input terminals 50, 52, 54 are connected to the dual speed controller output terminals 40, 42, 44 by the armored cable conductors 48A, 48B and 48C, respectively. The dual speed controller housing 10 is electrically grounded to the motor housing 12A by the ground conductor 48D.

In the exemplary embodiment, the induction motor 12 is a fractional horsepower, split phase capacitor run induction motor having an armature winding 56 which is wound within slots of an annular stator core. The armature winding 56 is inductively coupled to a rotor 58 which includes a short circuit squirrel cage field winding 60. The rotor 58 is mechanically coupled to a fan propeller 62 by a rotor shaft 64.

The armature winding 56 has a main winding coil section 66 and an auxiliary winding 68. The auxiliary winding 68 includes two winding sections 68A, 68B which are connected in electrical series circuit relation. The auxiliary winding sections 68A, 68B are joined together at a tap node T, which is electrically connected to the low speed power input terminal 50. Likewise, the auxiliary winding coil section 68B is connected in electrical series relation with the main winding coil 66 at a high speed power input node 70. A start/run capacitor C is connected in series circuit relation with the auxiliary winding 68, and in parallel with the overall armature winding 56. According to this arrangement, current through the auxiliary winding 68 is phase shifted, thereby providing starting torque.

Speed control at high speed operation and low speed operation is provided in this exemplary embodiment by selectively applying excitation current across the main winding coil 66 for high speed operation, or by applying excitation current across the auxiliary winding tap T for low speed operation.

Prior art examples of tapped winding induction motors which utilize a manual switch for selecting multiple operating speeds are shown in U.S. Pat. Nos. 4,486,699; 4,737,701; 3,264,542; 3,887,854; and Soviet Union Patent SU-B90,525. U.S. Pat. No. 2,570,894 discloses a shaded pole induction motor having a tapped winding for speed control purposes. Other induction motor circuits, for example those which include a switched capacitor for speed control, may also be used to good advantage as shown in U.S. Pat. No. 4,408,150; British Patent 2,105,931 and West German Patent 3,043,368. The disclosures of the foregoing patents are incorporated by reference herein for all purposes. The foregoing patents disclose tapped winding and switched capacitor speed control circuits in combination with split phase capacitor start/run induction motors and shaded pole induction motors in which the operating speed is manually controlled by an operator selector switch, and which can be adapted for use in combination with the automatic dual speed controller 10 of the present invention.

It will be appreciated, upon review of the foregoing prior art induction motor circuits, that speed control can be provided by a number of circuits which utilize a manual switch. However, such manual control switch arrangements require operator attention and intervention to switch from one speed to another, and therefore lack the convenience and efficiency of operation as provided by the dual speed controller circuit 10 of the present invention.

Referring again to FIG. 2, the dual speed controller 10 selectively applies operating power to the low speed input terminal 50 or to the high speed input terminal 52 of the induction drive motor 12 according to the open circuit/closed circuit condition of a low temperature thermostat 72 and a high temperature thermostat 74. The low temperature thermostat 72 is a normally open thermostat which is adapted to close in response to a sensed low temperature condition for example attic air at 80 degrees F. The high temperature thermostat 74 is adapted to close in response to a sensed high temperature condition, for example the temperature of attic air at 90 degrees F. Operating power conducted by the hot power conductor 28B and the common return power conductor 28A is conditionally applied to the low speed motor input terminal 50 through the low temperature thermostat 72 and through the normally closed circuit contact N.C. of a single pole, double throw selector switch assembly 76. Operating power is conditionally applied to the high speed motor input terminal 52 through the high temperature thermostat 74 and the normally open circuit contact N.O. of the selector switch 76.

The operating position of the selector switch 76 is changed from the normally closed circuit position N.C. to the normally open circuit position N.O. by switch mode actuator 78. The switch mode actuator 78 includes a solenoid control winding 80 and a mechanical linkage 82. The mechanical linkage 82 is coupled to a movable switch element 76A of the selector switch assembly 76. According to this arrangement, the movable switch element 76A is shifted from electrical contacting engagement with the normally closed terminal N.C. of the switch 76 to the normally open terminal N.O. in response to the application of electrical power to the solenoid control winding 80.

The low temperature thermostat 72 is a normally open thermostat switch having an unswitched power terminal 72A, a switched power terminal 72B and a temperature responsive switch element 72C. The switch element 72C is a bimetal temperature detector which is adapted to make a closed circuit between the switched and unswitched power terminals at a first sensed attic air temperature level, for example 80 degrees F. Similarly, the high temp thermostat 74 has an unswitched power terminal 74A, a switched power terminal 74B and a temperature responsive switch element 74C which is adapted to make a closed circuit between the switched and unswitched power terminals at a second sensed attic air temperature level, for example 90 degrees F.

Preferably, the low temp thermostat 72 and the high temp thermostat 74 are normally open thermostats, for example as sold by Norstat Corporation, Part No. SA23G, rated at 120 VAC, 10 amps. Preferably, the threshold temperature is adjustable, and both of the Norstat thermostats 72, 74 have a temperature threshold adjustment which is variable over the range from 60 degrees F.-120 degrees F. Preferably, the low temp threshold setting should be at least 10 degrees below the high temp setting.

Figure 2:
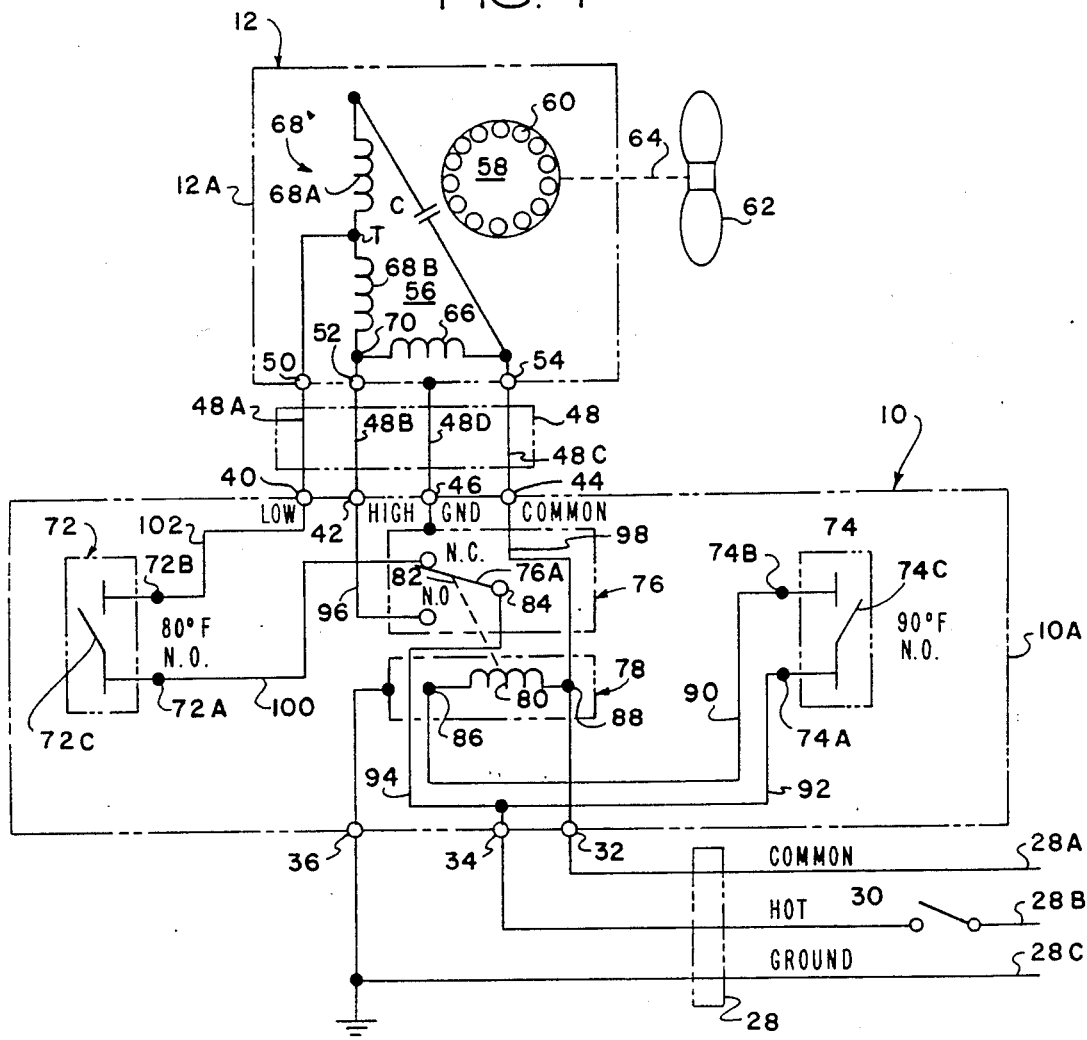

In the exemplary embodiment, the single pole, double throw selector switch assembly 76 and the solenoid assembly 78 are combined in a solenoid switch assembly, for example as sold by Potter & Brumfield Corporation, Part No. KU-90539. The Potter & Brumfield solenoid switch assembly is rated for operation at 120 VAC, 50/60 Hz, 3 amps, ½ HP, 600 VAC. Although the solenoid power switch assembly as shown in FIG. 2 is preferred, other single pole, double throw selector switching circuits may be used to good advantage including, for example, solid state power switching relays.

In the exemplary embodiment, the single pole, double throw switch relay switch 76 has an unswitched power terminal 84 which is electrically connected to the movable switch element 76A for selectively applying operating power to the normally closed terminal N.C. when the solenoid control winding 80 is de-energized, and for applying operating power to the normally open terminal N.O. when the solenoid control winding 80 is energized. The control winding 80 of the switch mode actuator 78 has power terminals 86, 88 to which electrical power is conditionally applied through the high temp thermostat 74. The switched power terminal 74B of the high temp thermostat 74 is electrically connected to the power terminal 86 of the control winding 80 by a power conductor 90. The unswitched power terminal 74A of the high temp thermostat is electrically connected to the hot power input terminal 34 by a power conductor 92.

According to the foregoing arrangement, electrical power is applied to the solenoid control winding 80 only when the high temp thermostat 74 is in its closed circuit condition corresponding with a sensed temperature of 90 degrees F. or higher. For high speed operation, operating power is conditionally applied to the high speed motor input terminal 52 through the high temperature thermostat 74 and the normally open contact N.O. of the selector switch 76. Operating power is conducted from hot power input terminal 34 to the unswitched terminal 84 of the selector switch through a power conductor 94.

Upon closure of the high temp thermostat 74, operating power is applied to the solenoid control winding 80, thereby driving the movable switch element 76A into electrical contacting engagement with the normally open contact N.O. of the selector switch 76. Operating power is conducted from the hot power input terminal 34 through the normally open selector switch contact N.O. to the high speed output terminal 42 by a power conductor 96. Operating current is conducted through the armored cable conductor 48B to the high speed power input node 7 of the armature winding 56. The excitation current is returned through the armored cable conductor 48C from the common return power input terminal 54 to the common return power output terminal 44 by a power conductor 98 which is electrically connected to the control winding power terminal 88 and the common return input power terminal 32.

For low speed operation, operating power is conditionally applied to the low speed motor input terminal 50 through the low temperature thermostat 72 and through the normally closed contact N.C. of the selector switch 76. Electrical power applied through the normally closed contact N.C. of the selector switch 76 is conducted to the unswitched terminal 72A of the low temp thermostat 72 by a power conductor 100. In response to a sensed attic air temperature of 80 degrees F. or more, the low temp thermostat 72 moves to its closed circuit position, thereby applying operating power to its switched power terminal 72B. The operating power is conducted to the low speed output terminal 40 by a power conductor 102.

The operating power is thereafter conducted to the low speed power input terminal 50 of the induction motor 12 through the armored cable conductor 48A. The operating power is applied to the tapped auxiliary winding node T, thereby driving the rotor 58 at a reduced operating speed. Excitation current is returned through the series connected auxiliary winding coil section 68B and main winding coil 66 to the common return power input terminal 54, the armored cable conductor 48C, and thereafter to the common return output terminal 44, which is directly connected to the common return power input terminal 32.

According to the foregoing arrangement, the induction motor 12 is turned on automatically and is operated at a low fan speed when the sensed attic air temperature exceeds a low temperature threshold level, for example 80 degrees F. The motor speed is switched automatically to a high operating fan speed when the sensed attic air temperature exceeds a high temperature threshold level, for example 90 degrees F. When the attic air temperature declines, for example as a result of a change from day to night or as a result of changing weather conditions, the ventilator fan motor 12 is automatically switched from the high operating speed to the low operating speed in response to a change from closed circuit condition to open circuit condition by the high temp thermostat 74.

Low speed operation will continue for as long as the attic air temperature remains below the high temperature threshold level and above the low temperature threshold level. When the attic air temperature drops below the high temperature threshold level, the high temp thermostat 74 opens, thereby interrupting power to the solenoid control winding 80. When this occurs, the movable switch element 76A returns to electrical contacting engagement with the normally closed power terminal N.C., thereby conducting electrical power from the hot power conductor 28B through the power conductor 100 to the unswitched power terminal 72A of the low temp thermostat 72. Assuming that the sensed attic air temperature is 80 degrees F. or more, the low temp thermostat 72 is in its closed circuit condition, thereby applying operating power through the power conductor 102 to the low speed power input motor terminal 50. All electrical power to the induction motor 12 is automatically interrupted when the attic air temperature falls below the low temperature threshold level (80 degrees F.), because both thermostats 72, 74 are in the normally open operating mode at sensed temperatures below the low temperature threshold.

It will be appreciated that the cost of operating an electrically powered induction motor in an attic ventilator installation as illustrated in FIGS. 1 and 2 is minimized, since the induction motor 12 is operated at a low speed during low solar loading conditions, for example during late night and early morning, and is driven at a high operating speed only during high solar loading conditions, for example during mid-morning through late afternoon and early evening. Maximum operating efficiency is achieved since the dual speed controller 10 of the invention turns the drive motor on and off automatically and selects a low fan speed or high fan speed depending upon sensed thermal load conditions, without requiring operator attention or intervention. The dual speed controller 10 thus accommodates changing weather conditions, such as a cold front or rainstorm, which may occur at any time, as well as accommodating the usual temperature fluctuations associated with day and night operation.

Although the invention has been described with reference to a preferred embodiment, and with reference to a specific split phase capacitor run induction motor in an attic fan gable mount installation, the foregoing description is not intended to be construed in a limiting sense. Modifications of the disclosed embodiment as well as alternative applications of the invention will be suggested to persons skilled in the art by the foregoing specification and illustrations. For example, a humidistat can be connected in parallel with either thermostat for override control during excessive attic humidity conditions. Additional thermostats can be connected in parallel or in series with the selector switch for automatic control of multiple speed induction motors at other operating speeds. Moreover, the controller circuit can be connected to multiple speed induction motors for control of mechanical load devices other than fans in response to other sensed analog conditions such as pressure, fluid flow rate and light level; and, in response to the ON/OFF logic states of logic switching devices. It is therefore contemplated that the appended claims will cover any such modifications or embodiments that fall within the true scope of the invention.

What is claimed is:

1. A speed control circuit for applying electrical power from a power distribution circuit of the type having hot and return power conductors to a multiple speed induction motor of the type including an armature winding having a high speed power terminal, a low speed power terminal and a return power terminal, said controller circuit comprising, in combination:

a first-normally open thermostat having an unswitched power terminal, a switched power terminal and a temperature responsive switch element adapted to make a closed circuit between said switched and unswitched power terminals at a first temperature level;

a second normally open thermostat having a switched power terminal, an unswitched power terminal and a temperature responsive switch element adapted to make a closed circuit between said switched and unswitched power terminals at a second temperature level;

a single pole, double throw switch assembly, said switch assembly having an unswitched power terminal, normally closed and normally open power terminals and a movable switch element connected to said unswitched power terminal;

a solenoid including a control winding having first and second power terminals and control linkage mechanically coupled to said movable switch element for moving said switch element from electrical contacting engagement with said normally closed power terminal to said normally open power terminal in response to the application of electrical power to said control winding;

the switched power terminal of said first thermostat being adapted for connection to the low speed power terminal of said motor, the unswitched power terminal of said first thermostat being connected to the normally closed power terminal of said switch assembly, the switched power terminal of said second thermostat being electrically connected to the first power terminal of said solenoid control winding, the unswitched power terminal of said second thermostat being connected to the unswitched power terminal of said switch assembly, the second power terminal of said solenoid winding being adapted for connection to the return power terminal of said induction motor and to the return power conductor of said power source, the normally open power terminal of said switch assembly being adapted for connection to the high speed power terminal of said induction motor, and the unswitched power terminal of said switch assembly being adapted for electrical connection to the hot power conductor of said power source.

2. A control circuit for applying electrical power from hot and return power distribution conductors to a dual speed induction motor comprising:

a low speed power output terminal, a high speed power output terminal and a power return output terminal;

a hot power input terminal and a power return input terminal;

a first normally open thermostat switch having a temperature responsive switch element which is adapted to close in response to a first temperature level;

a second normally open thermostat switch having a temperature responsive element which is adapted to close in reponse to a second temperature level;

a single pole, double throw switch having an unswitched power input terminal, a normally closed, switched power output terminal, a normally open, switched power output terminal and a movable switch element electrically connected to said unswitched power input terminal;

a solenoid including a control winding having first and second power terminals for conducting electrical current from said power source, said solenoid having linkage mechanically coupled to said movable switch element for moving said switch element from contacting engagement with sad normally closed power output terminal to said normally open power output terminal in response to the application of electrical power to said control winding; and, said first normally open thermostat having switched and unswitched power terminals connected in electrical series circuit relation with the low speed power output terminal and the normally closed, switched power output terminal of said switch assembly, respectively, said second normally open thermostat switch having switched and unswitched power terminals connected in electrical series relation with the first power terminal of said solenoid control winding and the unswitched power input terminal of said switch assembly respectively, the second power terminal of said solenoid winding being connected to the power input and power output return terminals, the normally open power output terminal of said switch assembly being connected to said high speed power output terminal, and the unswitched power terminal of said single pole, double throw switch being connected to the hot power input terminal.

3. A controller for selectively applying electrical power from a power distribution circuit to a multiple speed induction motor of the type including an armature winding having a high speed power terminal, a low speed power terminal and a common return power terminal, said control circuit comprising a first normally open thermostat switch adapted to close in response to a first sensed temperature level;

a second normally open thermostat switch which is adapted to close in response to a second sensed temperature level;

a single pole, double throw selector switch having a normally closed switching circuit and a normally open switching circuit, and a solenoid mechanically coupled to said selector switch for changing the operating mode of said selector switch from said normally closed circuit condition to the normally open circuit condition in response to the application of power to said solenoid, a low temp thermostat being coupled to the normally closed circuit of said selector switch for conditionally applying operating power to the low speed power terminal of said induction motor when said low temp thermostat is in closed circuit condition and a high temp thermostat is in open circuit condition, and said high temp thermostat being coupled in series with said solenoid for applying operating power to said solenoid when said high temp thermostat is in the closed circuit condition.

4. An attic ventilator system comprising, in combination:

an induction motor having an armature winding, a rotor magnetically coupled to said armature winding, a fan blade mechanically coupled to said rotor, said armature winding having a low speed input power terminal, a high speed input power terminal and a common return power terminal;

a high temp normally open thermostat switch having a temperature responsive switch element which is adapted to close in response to a first temperature level;

a low temp normally open thermostat switch having a temperature responsive element which is adapted to close in response to a second temperature level;

a single pole, double throw switch having an unswitched power terminal, a normally closed, switched power terminal, a normally open, switched power terminal and a movable switch element electrically connected to said unswitched power terminal;

a solenoid including a control winding having first and second power terminals for conducting electrical current from a hot power conductor to a common return power conductor, said solenoid having mechanical linkage coupled to said movable switch element for moving said switch element from contacting engagement with said normally closed power terminal to contacting engagement with said normally open power terminal in response to the application of electrical power to said control winding; and, said low temperature, normally open thermostat having switched and unswitched power terminals connected in electrical series circuit relation between the normally closed, switched power terminal of said selector switch assembly and the low speed power output terminal, said high temp thermostat switch having switched and unswitched power terminals connected in electrical series relation between the normally open power terminal of said selector switch assembly and the first power terminal of said solenoid control winding, the second power terminal of said solenoid winding being connected to the common power input and output return terminals, the normally open power terminal of said switch assembly being connected to said high speed power output terminal, and the unswitched power terminal of the selector switch being connected to the hot power conductor.

5. A controller for selectively applying electrical power from a power distribution circuit to a multiple speed induction motor of the type including an armature winding having a high speed power input terminal, a low speed power input terminal and a common return power terminal, said controller comprising, in combination:

a first detector for sensing the magnitude of a first operating condition;

a first normally open switch coupled to said first detector, said first switch being adapted to close in response to the detection of a first threshold level;

a second detector for sensing the magnitude of a second operating condition;

a second normally open switch coupled to said second detector, said second switch being adapted to close in response to the detection of a second threshold level;

a single pole, double throw selector switch having a normally closed switching circuit and a normally open switching circuit, and a switch mode actuator coupled to said selector switch for changing the operating mode of said selector switch from the normally closed circuit condition to the normally open circuit condition in response to the application of power to said switch mode actuator; and, said first switch being coupled to the normally closed circuit of said selector switch for conditionally applying operating power to the low speed power input terminal of said induction motor when said first switch is in closed circuit condition and said second switch is in open circuit condition, and said second switch being coupled in series with said switch mode actuator for applying operating power to said switch mode actuator when said second switch is in the closed circuit condition.

* * * * *

UNITED STATES PATENT AND TRADEMARK OFFICE
CERTIFICATE OF CORRECTION

PATENT NO. : 5,049,801

DATED : September 17, 1991

INVENTOR(S) : Paul S. Potter

It is certified that error appears in the above-identified patent and that said Letters Patent is hereby corrected as shown below:

Column 9, line 68, "reponse" should be -- response --.

Column 10, line 12, "sad" should be -- said --.

Signed and Sealed this

Second Day of March, 1993

*Attest:*

STEPHEN G. KUNIN

*Attesting Officer*  *Acting Commissioner of Patents and Trademarks*